US010972676B2

(12) United States Patent
Chan et al.

(10) Patent No.: US 10,972,676 B2
(45) Date of Patent: Apr. 6, 2021

(54) IMAGE PROCESSING METHOD AND ELECTRONIC DEVICE CAPABLE OF OPTIMIZING HDR IMAGE BY USING DEPTH INFORMATION

(71) Applicant: ALTEK CORPORATION, Hsinchu (TW)

(72) Inventors: Kai-Lin Chan, Hsinchu (TW); Hsu-Lien Huang, Taipei (TW)

(73) Assignee: ALTEK CORPORATION, Hsinchu (TW)

( * ) Notice: Subject to any disclaimer, the term of this patent is extended or adjusted under 35 U.S.C. 154(b) by 43 days.

(21) Appl. No.: 16/292,356

(22) Filed: Mar. 5, 2019

(65) Prior Publication Data

US 2020/0007732 A1 Jan. 2, 2020

(30) Foreign Application Priority Data

Jul. 2, 2018 (TW) ................................ 107122823

(51) Int. Cl.
*H04N 5/235* (2006.01)
*G06T 5/50* (2006.01)

(52) U.S. Cl.
CPC ............. *H04N 5/2355* (2013.01); *G06T 5/50* (2013.01); *H04N 5/2351* (2013.01); *H04N 5/2356* (2013.01); *G06T 2207/10028* (2013.01); *G06T 2207/10144* (2013.01); *G06T 2207/20208* (2013.01)

(58) Field of Classification Search
CPC .. H04N 5/2355; H04N 5/2351; H04N 5/2356; G06T 5/50; G06T 2207/10028; G06T 2207/10144; G06T 2207/20208
See application file for complete search history.

(56) References Cited

U.S. PATENT DOCUMENTS

| 9,270,899 B1* | 2/2016 | Ivanchenko | ....... G06K 9/00671 |
| 9,538,081 B1* | 1/2017 | Zhou | .................. G06K 9/00201 |

(Continued)

FOREIGN PATENT DOCUMENTS

| CN | 107948519 | 4/2018 |
| TW | 201215160 | 4/2012 |

(Continued)

OTHER PUBLICATIONS

"Office Action of Taiwan Counterpart Application," dated May 27, 2019, p. 1-p. 6.

*Primary Examiner* — Luong T Nguyen

(74) *Attorney, Agent, or Firm* — JCIPRNET

(57) ABSTRACT

An image processing method and an electronic device are provided. The method includes: obtaining a plurality of first images; obtaining first depth information; generating a second image according to the plurality of first images; identifying a subject and a background of the second image according to the first depth information; determining whether the subject of the second image needs to be optimized; when the subject of the second image needs to be optimized, optimizing the subject of the second image, generating an output image according to the background and the optimized subject, and outputting the output image; and when the subject of the second image does not need to be optimized, generating the output image according to the background and the subject and outputting the output image.

20 Claims, 6 Drawing Sheets

(56) References Cited

U.S. PATENT DOCUMENTS

| | | | | |
|---|---|---|---|---|
| 9,544,503 B2* | 1/2017 | Shroff | ................ | H04N 5/23216 |
| 2017/0070720 A1* | 3/2017 | Bishop | ............... | H04N 5/23229 |

FOREIGN PATENT DOCUMENTS

| | | |
|---|---|---|
| TW | 201314582 | 4/2013 |
| TW | 201531744 | 8/2015 |
| TW | 201605242 | 2/2016 |
| TW | 201621814 | 6/2016 |
| WO | 2015081562 | 6/2015 |

* cited by examiner

IMAGE PROCESSING METHOD AND ELECTRONIC DEVICE CAPABLE OF OPTIMIZING HDR IMAGE BY USING DEPTH INFORMATION

CROSS-REFERENCE TO RELATED APPLICATION

This application claims the priority benefit of Taiwan application serial no. 107122823, filed on Jul. 2, 2018. The entirety of the above-mentioned patent application is hereby incorporated by reference herein and made a part of this specification.

BACKGROUND OF THE INVENTION

1. Field of the Invention

The invention relates to an image processing method and an electronic device, and more particularly, to an image processing method and an electronic device for HDR images.

2. Description of Related Art

FIG. 1A to FIG. 1C are schematic diagrams illustrating a conventional image capturing technique for one single image. In the conventional image capturing technique for one single image, a dynamic range of a sensor is limited in a high contrast brightness scene (e.g., backlighting scene). In this case, if a subject (e.g., a portrait) is darker and a longer exposure is selected to increase the brightness of a dark region, a bright region of the image may become overexposed in response to the longer exposure. Consequently, a poor image may be formed, in which the subject has the normal brightness but a background is overexposed, as shown by FIG. 1A. If the exposure is changed to focus on the bright region instead, a shorter exposure would be selected to prevent the bright region from being overexposed. However, the region containing the subject of the image would become overly dark due to insufficient exposure, as shown by FIG. 1B. Therefore, no matter how the exposure is set, the user is unable to capture an image in which both the subject and the background are clear.

In general, to achieve an optimized result of the image, multiple images may be combined into one HDR image in which the brightness of each pixel may be adjusted through a tone reproduction technique. This method can restore the dynamic range of objects in the scene more accurately, prevent the regions in the image from becoming overexposed or overly dark and generate details for the bright and dark regions. Multiple copies of images with different exposure settings are usually required to generate a combined image properly. Accordingly, more computation time and RAM are needed to effectively complete the combined image. Nonetheless, other than time consuming, the regional tone reproduction are also prone to issue like halo (e.g., abnormal white or black edges at borders between black and white regions), as shown by FIG. 1C. Further, in the existing HDR image processing technique, after going through an image processing combination, a contrast ratio of the subject may often drop, resulting in reduction on a stereoscopic effect of the subject and unnatural brightness changes.

SUMMARY OF THE INVENTION

The invention is directed to an image processing method and an electronic device, which are capable of optimizing an HDR image by using depth information so the optimized HDR image can be closer to what human eyes can see and achieve a better visual effect.

The invention proposes an image processing method for an electronic device. The method includes: obtaining a plurality of first images; obtaining first depth information; generating a second image according to the plurality of first images; identifying a subject and a background of the second image according to the first depth information; determining whether the subject of the second image needs to be optimized; when the subject of the second image needs to be optimized, optimizing the subject of the second image, generating an output image according to the background and the optimized subject, and outputting the output image; and when the subject of the second image does not need to be optimized, generating the output image according to the background and the subject, and outputting the output image.

In an embodiment of the invention, the step of obtaining the plurality of first images includes: obtaining second depth information corresponding to the subject; determining a first exposure value according to the second depth information; determining at least one second exposure value according to the first exposure value; and capturing the plurality of first images according to the first exposure value and the at least one second exposure value.

In an embodiment of the invention, the step of obtaining the first depth information includes: obtaining the first depth information according to a third image captured by using the first exposure value among the plurality of first images.

In an embodiment of the invention, the method further includes: obtaining a fourth image captured by using the first exposure value, wherein an image capturing circuit for capturing the plurality of first images is different from a depth sensing circuit for capturing the fourth image. The step of obtaining the first depth information includes: obtaining the first depth information according to the third image and the fourth image.

In an embodiment of the invention, the step of obtaining the second depth information corresponding to the subject includes: obtaining at least one fifth image, wherein the at least one fifth image is captured by the image capturing circuit; obtaining at least one sixth image, wherein the at least one sixth image is captured by the depth sensing circuit; and obtaining the second depth information corresponding to the subject according to the at least one fifth image and the at least one sixth image.

In an embodiment of the invention, the second depth information is obtained through a depth sensing circuit, and the step of obtaining the first depth information includes: obtaining the first depth information according to the third image captured by using the first exposure value among the plurality of first images and third depth information obtained by sensing the subject through the depth sensing circuit.

In an embodiment of the invention, the step of determining whether the subject of the second image needs to be optimized includes: determining whether a difference between a first parameter of the subject of the second image and a second parameter of the subject of the at least one fifth image is greater than a threshold according to the second image and at least one fifth image among the plurality of first images; when the difference is greater than the threshold, determining that the subject of the second image needs to be optimized; and when the difference is not greater than the threshold, determining that the subject of the second image does not need to be optimized.

In an embodiment of the invention, the first parameter and the second parameter are a brightness value and/or a contrast ratio.

In an embodiment of the invention, the step of generating the output image includes: blurring the background, and generating the output image according to the blurred background.

In an embodiment of the invention, the second image is an HDR (High Dynamic Range) image.

The invention proposes an electronic device. The electronic device includes a processor. The processor is configured to execute operations of: obtaining a plurality of first images; obtaining first depth information; generating a second image according to the plurality of first images; identifying a subject and a background of the second image according to the first depth information; determining whether the subject of the second image needs to be optimized; when the subject of the second image needs to be optimized, optimizing the subject of the second image, generating an output image according to the background and the optimized subject, and outputting the output image; and when the subject of the second image does not need to be optimized, generating the output image according to the background and the subject, and outputting the output image.

In an embodiment of the invention, in the operation of obtaining the plurality of first images, the processor is further configured to execute operations of: obtaining second depth information corresponding to the subject; determining a first exposure value according to the second depth information; determining at least one second exposure value according to the first exposure value; and the processor captures the plurality of first images according to the first exposure value and the at least one second exposure value.

In an embodiment of the invention, in the operation of obtaining the first depth information, the processor obtains the first depth information according to a third image captured by using the first exposure value among the plurality of first images.

In an embodiment of the invention, the processor obtains a fourth image captured by using the first exposure value, wherein an image capturing circuit for capturing the plurality of first images is different from a depth sensing circuit for capturing the fourth image. In the operation of obtaining the first depth information, the processor obtains the first depth information according to the third image and the fourth image.

In an embodiment of the invention, in the operation of obtaining the second depth information, the processor obtains at least one fifth image, wherein the at least one fifth image is captured by the image capturing circuit. The processor obtains at least one sixth image, wherein the at least one sixth image is captured by the depth sensing circuit. The processor obtains the second depth information corresponding to the subject according to the at least one fifth image and the at least one sixth image.

In an embodiment of the invention, the second depth information is obtained through a depth sensing circuit. In the operation of obtaining the first depth information, the processor obtains the first depth information according to the third image captured by using the first exposure value among the plurality of first images and third depth information obtained by sensing the subject through the depth sensing circuit.

In an embodiment of the invention, in the operation of determining whether the subject of the second image needs to be optimized, the processor determines whether a difference between a first parameter of the subject of the second image and a second parameter of the subject of the at least one fifth image is greater than a threshold according to the second image and at least one fifth image among the plurality of first images. When the difference is greater than the threshold, the processor determines that the subject of the second image needs to be optimized. When the difference is not greater than the threshold, the processor determines that the subject of the second image does not need to be optimized.

In an embodiment of the invention, the first parameter and the second parameter are a brightness value and/or a contrast ratio.

In an embodiment of the invention, in the operation of generating the output image, the processor blurs the background, and generates the output image according to the blurred background.

In an embodiment of the invention, the second image is an HDR (High Dynamic Range) image.

Based on the above, the image processing method and the electronic device of the invention can use the depth information to optimize the subject in the HDR image and accordingly correct the brightness and/or the contrast ratio of the subject in the HDR image so the optimized HDR image can be closer to what human eyes can see and achieve the better visual effect.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
FIG. 1A to FIG. 1C are schematic diagrams illustrating a conventional image capturing technique for one single image.
Figure 1B:
Figure 1C:

Reference will now be made in detail to the present preferred embodiments of the invention, examples of which are illustrated in the accompanying drawings. Wherever possible, the same reference numbers are used in the drawings and the description to refer to the same or like parts.

Descriptions of the invention are given with reference to the exemplary embodiments illustrated with accompanied drawings, in which same or similar parts are denoted with same reference numerals. In addition, whenever possible, identical or similar reference numbers stand for identical or similar elements in the figures and the embodiments.

Figure 2:
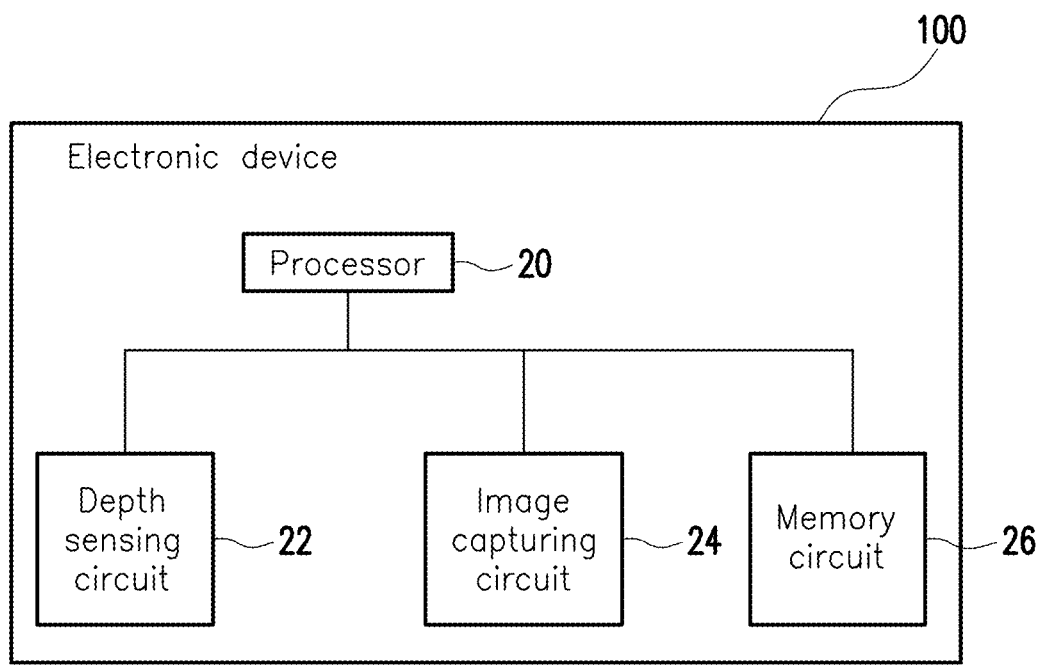
FIG. 2 is a schematic diagram illustrating an electronic device according to an embodiment of the invention.

FIG. 2 is a schematic diagram illustrating an electronic device according to an embodiment of the invention.

With reference to FIG. 2, an electronic device 100 includes a processor 20, a depth sensing circuit 22, an image capturing circuit 24 and a memory circuit 26. Among them, the depth sensing circuit 22, the image capturing circuit 24 and the memory circuit 26 are coupled to the processor 20. The electronic device 100 is, for example, an electronic device, such as a cell phone, a tablet computer or a notebook computer, which are not particularly limited herein. It should be noted that, in this embodiment, the depth sensing circuit 22 and the image capturing circuit 24 are disposed in the electronic device 100. However, the invention is not limited in this regard. In other embodiments, the depth sensing circuit 22 and the image capturing circuit 24 may also be disposed in other devices than the electronic device 100.

The processor 20 may be a central processing unit (CPU) or other programmable devices for general purpose or special purpose such as a microprocessor and a digital signal processor (DSP), a programmable controller, an application specific integrated circuit (ASIC) or other similar elements or a combination of above-mentioned elements.

The depth sensing circuit 22 may be a depth sensor used to obtain depth by emitting an infrared ray and receiving a reflection of the infrared ray. Alternatively, the depth sensing circuit 22 may also be an image capturing circuit identical to the image capturing circuit 24, which may be used to capture images so the processor 20 can determine depth of object in the images according to an image captured by the depth sensing circuit 22 and an image captured by the image capturing circuit 24. Alternatively, the depth sensing circuit 22 may also be another circuit capable of obtaining depth information, which is not particularly limited herein.

The image capturing circuit 24 is configured to capture one or more images. For instance, the image capturing circuit 24 may be a camera lens having a charge coupled device (CCD), a complementary metal-oxide semiconductor (CMOS) device or other photosensitive devices.

The memory circuit 26 may be a fixed or a movable device in any possible forms including a random access memory (RAM), a read-only memory (ROM), a flash memory or other similar devices, or a combination of the above-mentioned devices.

In this exemplary embodiment, the memory circuit 26 of the electronic device 100 is stored with a plurality of program code segments. The program code segments may be executed by the processor 20 after being installed. For example, the memory circuit 26 is stored with a plurality of modules. Operations in the image processing method may be respectively executed by those modules, where each of the modules is composed of one or more program code segments. However, the invention is not limited in this regard. Each operation of the electronic device 100 may also be implemented in other hardware manners.

The image processing method of the invention is described below with reference to various embodiments.

First Embodiment

Figure 3:
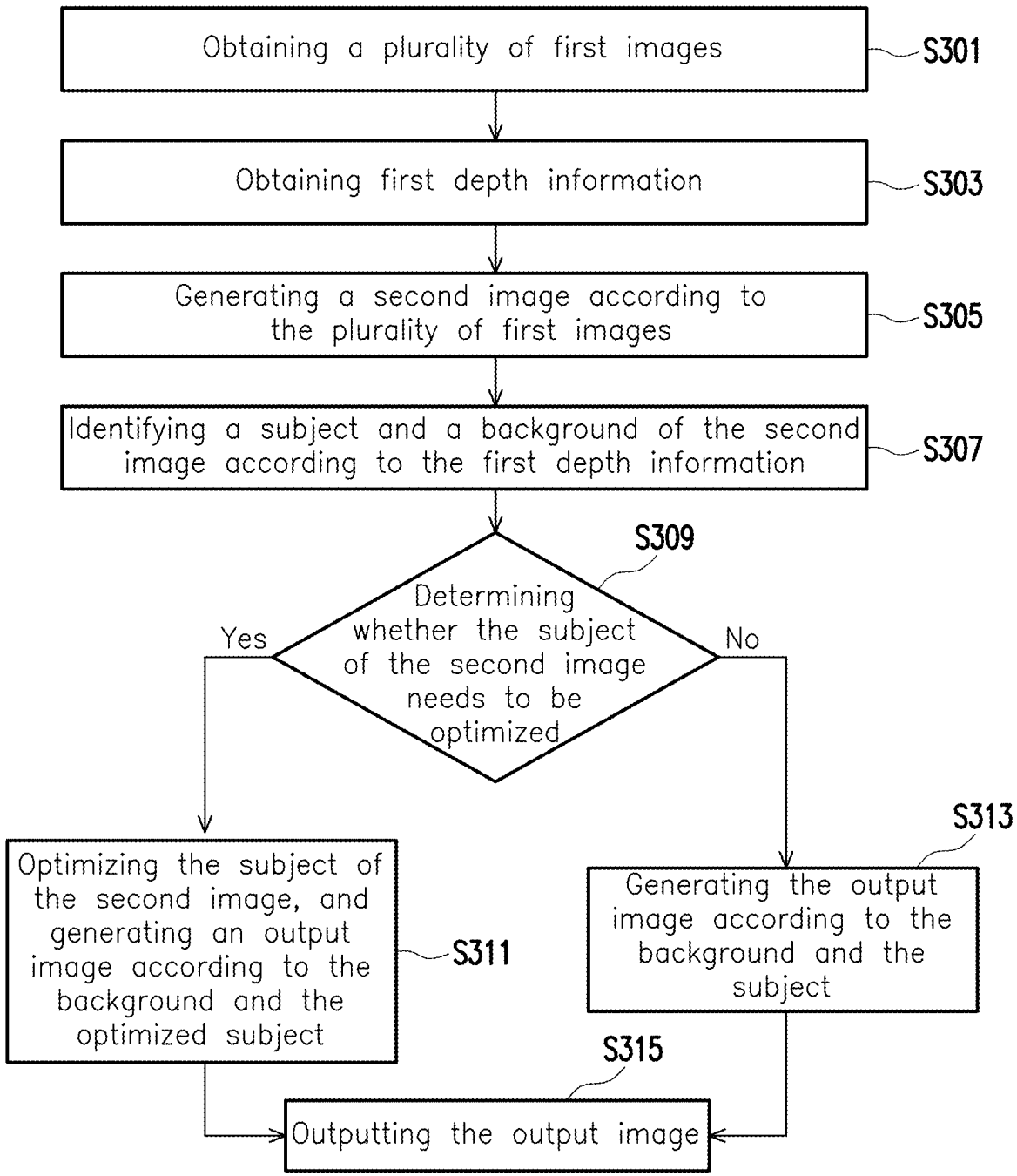
FIG. 3 is a flowchart illustrating an image processing method according the first embodiment of the invention.

FIG. 3 is a flowchart illustrating an image processing method according the first embodiment of the invention.

Figure 4:
FIG. 4 is a schematic diagram illustrating first depth information according to the first embodiment of the invention.

Referring to FIG. 2 and FIG. 3 together, first of all, the processor 20 can obtain a plurality of first images captured by the image capturing circuit 24 for a scene (step S301). These first images may be captured by using different exposure values, respectively. Afterwards, the processor 20 can obtain first depth information detected by the depth sensing circuit 22 and/or the image capturing circuit 24 (step S303). The first depth information is, for example, depth information corresponding to said scene obtained by detecting said scene through the depth sensing circuit 22 and/or the image capturing circuit 24. For example, FIG. 4 is a schematic diagram illustrating first depth information according to the first embodiment of the invention. With reference to FIG. 4, the depth sensing circuit 22 and/or the image capturing circuit 24 can perform depth detection on the scene having a person (i.e., a subject) in order to obtain depth information as shown by FIG. 4.

Further, the processor 20 also generates one second image according to the first images (step S305). In this exemplary embodiment, the second image is an HDR (High Dynamic Range) image, and the image can preserve the light and dark details of the real environment. It should be noted that, in the HDR image generated through an image combination, a brightness value and/or a contrast ratio of the subject may be decreased (or deteriorated). Therefore, the image processing method of the invention can be used to optimize the subject of the second image according to the first depth information.

More specifically, the processor 20 identifies positions of the subject and a background of the second image according to the first depth information (step S307). After the subject and the background of the second image are identified, the processor 20 determines whether the subject of the second image needs to be optimized (step S309). In this exemplary embodiment, the processor 20 selects at least one image (a.k.a. a fifth image) from the first images, and determines whether a difference between a parameter (a.k.a. a first parameter) of the subject of the second image and a parameter (a.k.a. a second parameter) of the subject of the fifth image is greater than a threshold according to the second image and the fifth image. When the difference is greater than the threshold, the processor 20 determines that the subject of the second image needs to be optimized. However, when the difference is not greater than the threshold, the processor 20 determines that the subject of the second does not need to be optimized. In particular, the first parameter and the second parameter may be the brightness value and/or the contrast ratio.

Figure 5:
FIG. 5 is a schematic diagram illustrating an output image according to the first embodiment of the invention.

When the subject of the second image needs to be optimized, the processor 20 optimizes the subject of the second image, and generates an output image according to the background of the second image and the optimized subject of the second image (step S311). Here, this optimization may include a tone mapping process or other optimizing processes, which are not particularly limited herein. However, when the subject of the second image does not need to be optimized, the processor 20 generates the output image according to the background and the subject of the second image (step S313). Afterwards, the processor 20 outputs the output image (step S315). For example, FIG. 5 is a schematic diagram illustrating an output image according to the first embodiment of the invention. With reference to FIG. 5, after step S311 or step S313 is executed by the processor 20, the processor 20 generates the output image as shown by FIG. 5 and outputs the image in step S315. In particular, once the subject is processed by the optimization, the output image can be closer to what human eyes can see.

In an embodiment, before the output image is generated in the step S311 or step S313, the processor 20 can further blur the background and generate the output image according to the blurred background and the subject.

It should be noted that, the invention is not intend to limit an executing sequence of steps in FIG. 3. In other embodiments, step S305 may first be executed before step S303 is performed.

Second Embodiment

Figure 6:
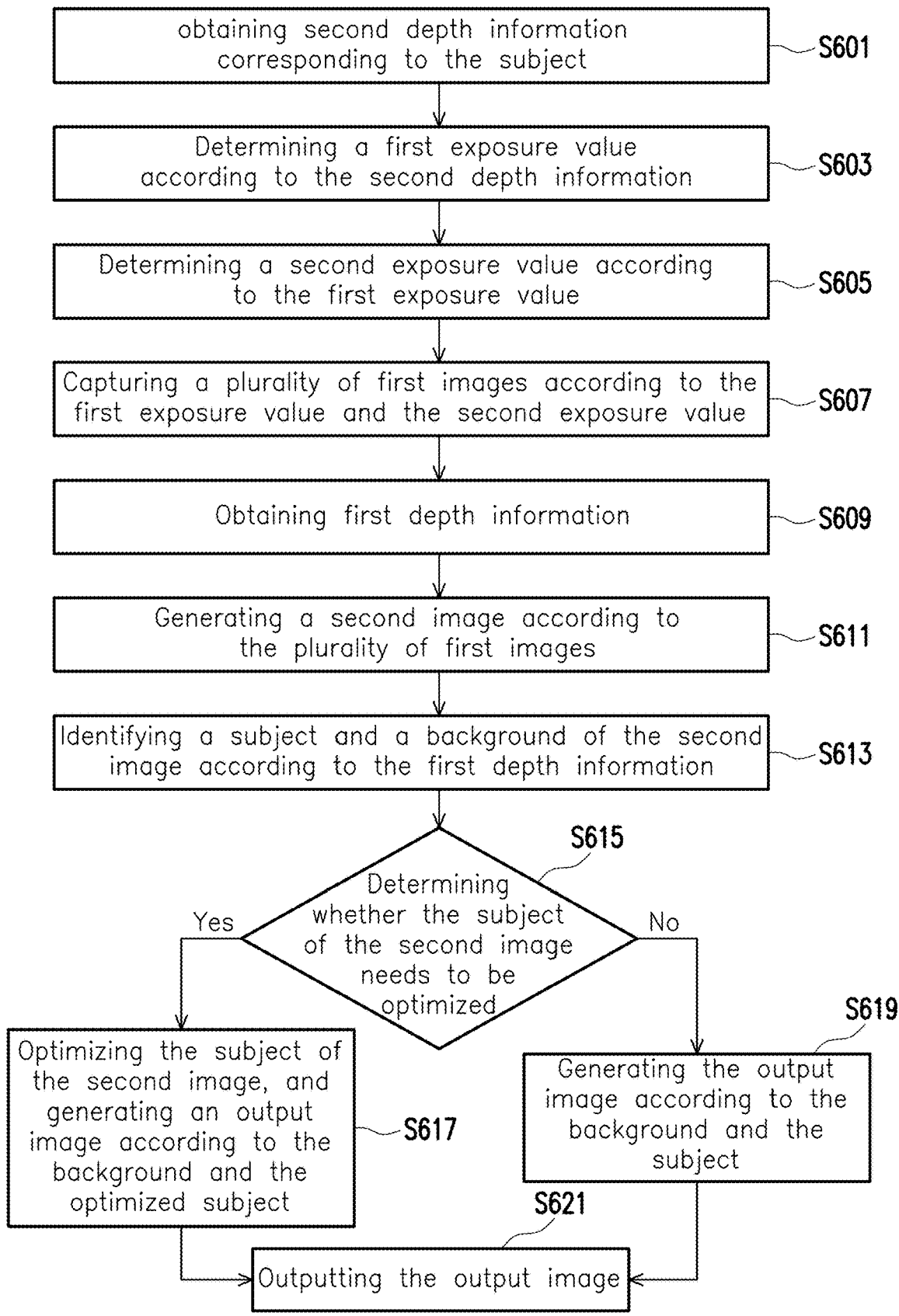
FIG. 6 is a flowchart illustrating an image processing method according the second embodiment of the invention.

FIG. 6 is a flowchart illustrating an image processing method according the second embodiment of the invention.

Referring to FIG. 2 and FIG. 6 together, in this exemplary embodiment, the processor 20 obtains second depth information corresponding to the subject in the scene to be shot (step S601). In an embodiment, if the depth sensing circuit 22 is also an image capturing circuit similar to the image capturing circuit 24, the processor 20 can obtain an image (a.k.a. a fifth image) captured by the depth sensing circuit 22 and an image (a.k.a. a sixth image) captured by the image capturing circuit 24, and obtain the second depth information corresponding to the subject in the scene according to the fifth image and the sixth image. However, the invention is not limited in this regard. In another embodiment, the second depth information may also be obtained by directly sensing depth through the depth sensing circuit 22.

After obtaining the second depth information, the processor 20 determines a first exposure value according to the second depth information (step S603), and determines at least one exposure value according to the first exposure value (step S605). For instance, the first exposure value is, for example, an optimal exposure value (e.g., 0 EV) for shooting the scene. Later, when the HDR image is to be generated, an image captured by using the first exposure value is used as a subject image. Further, the second exposure value may be, for example, a plurality exposure values (e.g., +N EV or −N EV) extended on basis of the optimal exposure value.

After determining the first exposure value and the second exposure value, the processor 20 controls the image capturing circuit 24 to capture the first images from the scene to be shot according to the first exposure value and the second exposure value (step S607). Here, the first images include an image (a.k.a. a third image) captured by using the first exposure value and an image captured by using the second exposure value.

Then, the processor 20 obtains first depth information (step S609). In an embodiment, if the depth sensing circuit 22 is also an image capturing circuit similar to the image capturing circuit 24, the processor 20 can obtain an image (a.k.a. a fourth image) taken (captured) by using the first exposure value through the depth sensing circuit 22, and obtain the first depth information as illustrated in FIG. 4 according to the third image and the fourth image. However, in another embodiment, the processor 20 may also obtain the first depth information as illustrated in FIG. 4 according to the third image and depth information (a.k.a. third depth information) obtained by sensing the shot scene through the depth sensing circuit 22. In particular, the identified first depth information includes depth information of the subject and the background in the HDR image.

Further, the processor 20 also generates one second image according to the first images (step S611). In this exemplary embodiment, the second image is an HDR (High Dynamic Range) image.

Then, the processor 20 identifies positions of the subject and the background of the second image according to the first depth information (step S613). After identifying the subject and the background of the second image, the processor 20 determines whether the subject of the second image needs to be optimized (step S615). In this exemplary embodiment, the processor 20 selects at least one image (a.k.a. a fifth image) from the first images, and determines whether a difference between a parameter (a.k.a. a first parameter) of the subject of the second image and a parameter (a.k.a. a second parameter) of the subject of the fifth image is greater than a threshold according to the second image and the fifth image. When the difference is greater than the threshold, the processor 20 determines that the subject of the second image needs to be optimized. However, when the difference is not greater than the threshold, the processor 20 determines that the subject of the second does not need to be optimized. In particular, the first parameter and the second parameter may be the brightness value and/or the contrast ratio. In particular, in this exemplary embodiment, the fifth image is the third image captured by using the first exposures value among the first images. However, the invention is not limited in this regard. In other embodiments, the fifth image may also be other images among the first images.

When the subject of the second image needs to be optimized, the processor 20 optimizes the subject of the second image, and generates an output image according to the background of the second image and the optimized subject of the second image (step S617). Here, this optimization may include a tone mapping process or other optimizing processes, which are not particularly limited herein. However, when the subject of the second image does not need to be optimized, the processor 20 generates the output image according to the background and the subject of the second image (step S619). Afterwards, the processor 20 outputs the output image (step S621).

In an embodiment, before the output image is generated in the step S617 or step S619, the processor 20 can further blur the background, and generate the output image according to the blurred background and the subject.

It should be noted that, the invention is not intend to limit an executing sequence of steps in FIG. 6. In other embodiments, step S611 may first be executed before step S609 is performed.

In summary, the image processing method and the electronic device of the invention can use the depth information to optimize the subject in the HDR image and accordingly correct the brightness and/or the contrast ratio of the subject in the HDR image so the optimized HDR image can be closer to what human eyes can see and achieve the better visual effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method for an electronic device, the method comprising:
    obtaining a plurality of first images;
    obtaining first depth information;
    generating a second image according to the plurality of first images;
    identifying a subject and a background of the second image according to the first depth information;
    determining whether the subject of the second image needs to be optimized;
    when the subject of the second image needs to be optimized, optimizing the subject of the second image, generating an output image according to the background and the optimized subject, and outputting the output image; and when the subject of the second image does not need to be optimized, generating the output image according to the background and the subject, and outputting the output image.

2. An image processing method for an electronic device, the method comprising:
  obtaining second depth information corresponding to the subject;
  determining a first exposure value according to the second depth information;
  determining at least one second exposure value according to the first exposure value;
  capturing a plurality of first images according to the first exposure value and the at least one second exposure value;
  obtaining first depth information;
  generating a second image according to the plurality of first images;
  identifying a subject and a background of the second image according to the first depth information;
  determining whether the subject of the second image needs to be optimized;
  when the subject of the second image needs to be optimized, optimizing the subject of the second image, generating an output image according to the background and the optimized subject, and outputting the output image; and
  when the subject of the second image does not need to be optimized, generating the output image according to the background and the subject, and outputting the output image.

3. The image processing method according to claim 2, wherein the step of obtaining the first depth information comprises:
  obtaining the first depth information according to a third image captured by using the first exposure value among the plurality of first images.

4. The image processing method according to claim 3, further comprising:
  obtaining a fourth image captured by using the first exposure value, wherein an image capturing circuit for capturing the plurality of first images is different from a depth sensing circuit for capturing the fourth image,
  wherein the step of obtaining the first depth information comprises:
  obtaining the first depth information according to the third image and the fourth image.

5. The image processing method according to claim 4, wherein the step of obtaining the second depth information corresponding to the subject comprises:
  obtaining at least one fifth image, wherein the at least one fifth image is captured by the image capturing circuit;
  obtaining at least one sixth image, wherein the at least one sixth image is captured by the depth sensing circuit; and
  obtaining the second depth information corresponding to the subject according to the at least one fifth image and the at least one sixth image.

6. The image processing method according to claim 3, wherein the second depth information is obtained through a depth sensing circuit, wherein the step of obtaining the first depth information comprises:
  obtaining the first depth information according to the third image captured by using the first exposure value among the plurality of first images and third depth information obtained by sensing the subject through the depth sensing circuit.

7. The image processing method according to claim 2, wherein the step of determining whether the subject of the second image needs to be optimized comprises:
  determining whether a difference between a first parameter of the subject of the second image and a second parameter of the subject of at least one fifth image is greater than a threshold according to the second image and the at least one fifth image among the plurality of first images;
  when the difference is greater than the threshold, determining that the subject of the second image needs to be optimized; and
  when the difference is not greater than the threshold, determining that the subject of the second image does not need to be optimized.

8. The image processing method according to claim 7, wherein the first parameter and the second parameter are a brightness value and/or a contrast ratio.

9. The image processing method according to claim 2, wherein the step of generating the output image comprises:
  blurring the background, and generating the output image according to the blurred background.

10. The image processing method according to claim 2, wherein the second image is an HDR (High Dynamic Range) image.

11. An electronic device, comprising:
  a processor, wherein
  the processor obtains a plurality of first images,
  the processor obtains first depth information,
  the processor generates a second image according to the plurality of first images,
  the processor identifies a subject and a background of the second image according to the first depth information,
  the processor determines whether the subject of the second image needs to be optimized,
  when the subject of the second image needs to be optimized, the processor optimizes the subject of the second image, generates an output image according to the background and the optimized subject, and outputs the output image, and
  when the subject of the second image does not need to be optimized, the processor generates the output image according to the background and the subject, and outputs the output image.

12. An electronic device, comprising:
  a processor, wherein
  the processor obtains second depth information corresponding to the subject,
  the processor determines a first exposure value according to the second depth information,
  the processor determines at least one second exposure value according to the first exposure value,
  the processor captures a plurality of first images according to the first exposure value and the at least one second exposure value,
  the processor obtains first depth information,
  the processor generates a second image according to the plurality of first images,
  the processor identifies a subject and a background of the second image according to the first depth information,
  the processor determines whether the subject of the second image needs to be optimized,
  when the subject of the second image needs to be optimized, the processor optimizes the subject of the second image, generates an output image according to the background and the optimized subject, and outputs the output image, and when the subject of the second image does not need to be optimized, the processor generates the output image according to the background and the subject, and outputs the output image.

13. The electronic device according to claim 12, wherein in the operation of obtaining the first depth information, the processor obtains the first depth information according to a third image captured by using the first exposure value among the plurality of first images.

14. The electronic device according to claim 13, wherein the processor obtains a fourth image captured by using the first exposure value, wherein an image capturing circuit for capturing the plurality of first images is different from a depth sensing circuit for capturing the fourth image, wherein in the operation of obtaining the first depth information, the processor obtains the first depth information according to the third image and the fourth image.

15. The electronic device according to claim 14, wherein in the operation of obtaining the second depth information corresponding to the subject, the processor obtains at least one fifth image, wherein the at least one fifth image is captured by the image capturing circuit, the processor obtains at least one sixth image, wherein the at least one sixth image is captured by the depth sensing circuit, and the processor obtains the second depth information corresponding to the subject according to the at least one fifth image and the at least one sixth image.

16. The electronic device according to claim 13, wherein the second depth information is obtained through a depth sensing circuit, wherein in the operation of obtaining the first depth information, the processor obtains the first depth information according to the third image captured by using the first exposure value among the plurality of first images and third depth information obtained by sensing the subject through the depth sensing circuit.

17. The electronic device according to claim 12, wherein in the operation of determining whether the subject of the second image needs to be optimized, the processor determines whether a difference between a first parameter of the subject of the second image and a second parameter of the subject of at least one fifth image is greater than a threshold according to the second image and the at least one fifth image among the plurality of first images, when the difference is greater than the threshold, the processor determines that the subject of the second image needs to be optimized, and when the difference is not greater than the threshold, the processor determines that the subject of the second image does not need to be optimized.

18. The electronic device according to claim 17, wherein the first parameter and the second parameter are a brightness value and/or a contrast ratio.

19. The electronic device according to claim 12, wherein in the operation of generating the output image, the processor blurs the background, and generates the output image according to the blurred background.

20. The electronic device according to claim 12, wherein the second image is an HDR (High Dynamic Range) image.

* * * * *